(12) United States Patent  
Aruga et al.

(10) Patent No.: US 8,004,776 B2  
(45) Date of Patent: Aug. 23, 2011

(54) OPTICAL PLATE FOR AN IMAGING CAMERA

(75) Inventors: Tadashi Aruga, Hachioji (JP); Takeshi Matsumiya, Tokyo (JP)

(73) Assignees: Tadashi Aruga, Hachioji-shi (JP); Itochu Aviation Co., Ltd, Tokyo (JP); NEC Corporation, Tokyo (JP)

( * ) Notice: Subject to any disclaimer, the term of this patent is extended or adjusted under 35 U.S.C. 154(b) by 0 days.

(21) Appl. No.: 12/593,373

(22) PCT Filed: Mar. 5, 2008

(86) PCT No.: PCT/JP2008/054424  
§ 371 (c)(1),  
(2), (4) Date: Nov. 30, 2009

(87) PCT Pub. No.: WO2008/117661  
PCT Pub. Date: Oct. 2, 2008

(65) Prior Publication Data  
US 2010/0118415 A1      May 13, 2010

(30) Foreign Application Priority Data

Mar. 27, 2007   (JP) .................... PCT/JP2007/057352

(51) Int. Cl.  
*G02B 9/00*  (2006.01)  
*G02B 9/08*  (2006.01)

(52) U.S. Cl. ........................................................ 359/738

(58) Field of Classification Search .................. 359/721, 359/722, 724, 738, 718  
See application file for complete search history.

(56) References Cited

U.S. PATENT DOCUMENTS 4,995,715 A * 2/1991 Cohen .......................... 359/721  
2006/0203360 A1   9/2006 Aruga

FOREIGN PATENT DOCUMENTS

| GB | 608892 | 9/1948 |
| JP | 11-6966 | 1/1999 |
| JP | 2004 77914 | 3/2004 |

* cited by examiner

*Primary Examiner* — Ali Cia M Harrington  
(74) *Attorney, Agent, or Firm* — Oblon, Spivak, McClelland, Maier & Neustadt, L.L.P.

(57) ABSTRACT

An optical plate for an imaging camera is proposed that is used for further deepening the depth of field. The optical plate is orthogonal to the optical axis, that, in shape, (1) is an optical plate that has the same effective aperture diameter as the imaging camera and is attached in front thereof to deepen the depth of field, and on the incidence plane or exit plane, is equipped with first and second regions in the effective aperture, the first region being on the inside (or is an outside region), with a surface shape curvature that increases going from optical axis to periphery, and a thickness that becomes thicker going from the center to the periphery, that delays the phase of transmitted light more at the periphery than the center, the second region being on the outside (or is an inside region) which has a plane parallel plate shape. Also, (2) an optical plate having a shape that is a synthesis of first and second shapes of incidence plane or exit plane, the first shape being a concave shape with a surface shape curvature that increases going from optical axis to periphery, and a thickness that becomes thicker going from the center to the periphery, that delays the phase of transmitted light more at the periphery than the center, the second shape being a convex shape with a constant surface shape curvature having the function of shifting the focal point position from long distance to the short-distance side.

3 Claims, 13 Drawing Sheets

OPTICAL PLATE FOR AN IMAGING CAMERA

TECHNICAL FIELD

This invention relates to an optical plate for an imaging camera used to further deepen the depth of field in the field of imaging technology in which an image is acquired that is formed on a film, a CCD, an imaging tube and so forth, using an imaging device.

BACKGROUND TECHNOLOGY

Hitherto, when imaging an object, an image has been acquired by using film, a CCD or other such imaging element, an imaging tube, and so forth, placed at the focal plane of various imaging lenses that include telephoto lens.

However, with the conventional technology, when the distance to the object changes it is necessary to change the focal point position, but the focal depth of the camera is limited, and it is difficult to image objects existing in a wide range of distance at a single focal point position. The depth of field can be deepened by deepening the focal depth of the lens. A simple method of deepening the depth of field of a camera is the aperture reduction method, but reducing the aperture degrades the resolution and reduces the intensity of the incident light, so it cannot be used on cameras that are used in dark environments in particular. Moreover, a close distance object cannot be focused unless the focal point position is shifted considerably, and even if it is focused, the depth of field decreases by the square of the shortness in distance, so it is difficult to view a wide range of distance at a close distance. With respect to depth of field, this has been a well-known limitation since before.

As a new method of deepening the depth of field, there is proposed an optical plate that increasingly delays the phase going from the center to the periphery.

For example, Patent Reference 1 (unexamined Japanese patent publication Hei 11-6966) discloses a telescopic system in which, in a Galileo telescope that combines a convex lens comprising an object lens system and a concave lens comprising an eyepiece system, distortion is induced by imparting spherical aberration to the concave lens so that the curvature at the aperture plane of the telescope decreases as the distance from the optical axis increases, producing a special non-diffractive beam that has a narrower width than the optical intensity distribution of the diffraction limit. The object of this was to produce a propagating non-diffractive beam that maintains the condensed light beam at a substantially constant width, and in which, at the same time, the resolution is at or above the resolution of the diffraction limit.

In Patent Reference 2 (unexamined Japanese patent publication 2004-77914), there is disclosed 1) a telescope comprised by combining an object optical system that uses a convex lens, a concave mirror or optical element equivalent to a convex lens, and an eyepiece optical system that uses a concave lens or optical element equivalent to a concave lens, or 2) a structure in which a wavefront control plate that controls the shape of a wavefront is provided in front of an eye or imaging camera having the function of deepening the depth of field of the eye or imaging camera, each 1) and 2) having a characteristic feature that by means of an imaging device and the optical system thereof, the phase of a light wave is delayed according to the distance from the optical axis, and as a result, the curvature in the wavefront of the image-forming light becomes smaller going from the optical axis to the aperture open end, or the phase of a light wave is delayed according to the distance from the aperture open end to the optical axis, and as a result, the curvature in the wavefront of the image-forming light becomes larger going from the aperture end to the optical axis.

REFERENCES

Patent Reference 1 unexamined Japanese patent publication Hei 11-6966
Patent Reference 2 unexamined Japanese patent publication 2004-77914

DISCLOSURE OF THE INVENTION

Although the conventional correcting plate used in imaging cameras deepens the depth of field, there is the problem that the field shifts to the long-distance side, blurring an object at the distance at which the imaging camera is focused. To solve this problem, the present invention proposes an optical plate that can deepen the depth of field without blurring an object at the focused distance by the imaging camera.

The optical plate for an imaging camera according to the present invention has the function of deepening the image-formation focal point, and a function that enables the focal point to be shifted for an object at a close distance while maintaining the focal depth, and enables high resolution imaging of wide-range objects without changing the focal point position. The provision of this characteristic is also effective with respect to moving objects that readily move from the focal point position. Therefore, the present invention can be widely applied to various types of camera including telephotography cameras, wide-range measurements and monitors and the like.

In addition to the conventional method in which the phase of transmitted light is increasingly delayed going from the center to the periphery, the optical plate attached in front of the imaging camera has a portion in which the phase is fixed and unchanging, provided within the aperture at the peripheral portion or center portion. This portion makes it possible to prevent blurring of an object at the distance at which the camera is focused. Imparting a new function to the optical plate by this special contrivance makes it possible to overcome a number of points that could not be achieved with the conventional technology. That is, in the case of a camera, for example, among optical plate aperture diameters that are the same as the camera aperture diameter, the phase of light transmitted within an annular peripheral strip portion or center circular portion stays fixed and unchanging while the phase of light transmitted by the remaining portion is increasingly delayed going from the center to the periphery. Thereby, a drawback in the conventional method is overcome, that is, the drawback that as a result of the overall focal point region shifting forwards (in the direction in which the light advances, the direction away from the lens), away from the original focal point position, the object at the distance at which the camera is focused is blurred. What is referred to here as the conventional method is the method in which within the aperture the phase is simply delayed increasingly towards the periphery.

To summarize, the present invention provides (1) a first optical plate for an imaging camera that continuously deepens the depth of field from the original focal distance to the long-distance side so that an object at the distance at which the imaging camera is focused does not blur, and (2) provides a second optical plate for an imaging camera that, conversely to the first optical plate for an imaging camera, uses a function that shifts the field from long distance to close distance and a function whereby the phase of transmitted light is increasingly delayed going from the center to the periphery, to deepen the depth of field on the close-distance side with the object at the distance at which the camera is focused in a state in which it does not blur. While the ability to deepen the depth of field so an object at the set focal point of the imaging camera does not blur is common to both the first optical plate for an imaging camera and the second optical plate for an imaging camera, the focal point region deepened by the second optical plate can be shifted backwards (closer to the lens), and moreover its shiftability can be freely changed by changing the surface shape of the optical plate, so the main difference from the first optical plate for an imaging camera is that, conversely, the depth of field can be deepened towards the short-distance side.

More specifically, the first optical plate for an imaging camera is an optical plate for an imaging camera that is orthogonal to the optical axis, has an effective aperture diameter that is the same as the effective aperture diameter of the imaging camera, is used attached in front of the imaging camera to enable depth of field to be deepened, and is equipped with a first region and a second region within the effective aperture on the incidence plane or exit plane.

Generally, the effective aperture diameter of the camera is defined as a value obtained by dividing the focal distance of a lens by the F-number. The effective aperture of the optical plate of the present invention is a region within the wide-open optical plate aperture (the region through which light can pass), in which the depth-of-field extending function of the optical plate of the invention effectively operates, the effective aperture diameter of the optical plate of the invention being fixed at the same value as the effective aperture diameter of the camera. Therefore, the optical plate is made to be used attached in front of the camera so the two effective apertures are superposed.

The above first region is an inside region that has a surface ratio that is 50 percent or more of an effective aperture of an optical plate for an imaging camera, has a curvature of a surface shape of an incidence plane or exit plane thereof that increases going from optical axis to periphery, a thickness thereof that becomes thicker going from center to periphery, so that a phase of transmitted light is increasingly delayed going from the center to the periphery; the second region is a remaining outside region of the first region, this region having a plane parallel plate shape and being a region in which a phase of light transmitted by the region has no transmission position dependency. Therefore, the outside region that is the second region is set to have a surface ratio relative to the effective aperture that is 50 percent or less.

If for example 70 percent of the first surface region is set to have a surface ratio that is 50 percent or more of the effective aperture, the surface ratio of the second region is the remaining 30 percent. In the case of a circular aperture, the ratio of the radial distance to the effective radius, which in the case of the first region will be a value that is the square root (½ square) of the surface ratio 0.7, and in the case of the second region will be $1-0.7^{1/2}$. The approximate values of each would be 0.84 and 0.16. The minimum value of 50 percent as surface ratio of the first region is approximately 70 percent as a radial distance ratio.

Or, as another method, the first region of a first optical plate for an imaging camera is an outside region having a surface ratio of 50 percent or more of the effective aperture, has a curvature of a surface shape of an incidence plane or exit plane thereof that increases going from optical axis to periphery, a thickness thereof that becomes thicker going from center to periphery, so that a phase of transmitted light is increasingly delayed going from center to periphery. Also, the second region is a remaining inside region of the first region, this region having a plane parallel plate shape and being a region in which a phase of light transmitted by the region has no transmission position dependency. Therefore, in this case, the inside region that is the second region is set to have a surface ratio relative to the effective aperture that is 50 percent or less.

In the case of either of the above two methods, the reason for making the surface area of the region having the function of delaying the phase and deepening the depth of field 50 percent or more of the surface area of the effective aperture (that is, the remaining plane shaped region that does not control the phase is 50 percent or less) is that if the region that controls the phase of the transmitted light is 50 percent or less, the depth-of-field deepening effect is halved, so that utilizing the optical plate of the present invention would have no meaning. Also, the reason for setting the surface area of the phase control region to have a width for a surface ratio of 50 percent or more relative to the effective aperture is that going with a surface area of the phase control region that is small (that is, with a remaining plane shaped region that does not control the phase that is large) reduces the extension of the focal depth, the forward shift of the focal point region becomes smaller, reducing the shift from the original focal point. It is also necessary to take into account that the degree of change also depends on the wavelength; for example, the shorter the wavelength, the greater the extension of the focal depth. Because of that, it has been made possible for a user to select a surface ratio suitable for the purpose.

Also, the second optical plate for an imaging camera is an optical plate that is orthogonal to the optical axis, has an effective aperture diameter that is the same as the effective diameter of the imaging camera, is used attached in front of the imaging camera to enable depth of field to be deepened, and has an incidence plane or exit plane having a shape that is a synthesis of a first shape and a second shape. Here, the first shape is a concave surface shape having a curvature that increases going from optical axis to periphery, a thickness thereof that becomes thicker going from center to periphery, so that a phase of transmitted light is increasingly delayed going from center to periphery. The second shape is a convex surface shape having a constant curvature, that has the function of shifting the focal point position from long distance to the short distance side.

BEST MODE FOR CARRYING OUT THE INVENTION

Figure 1:
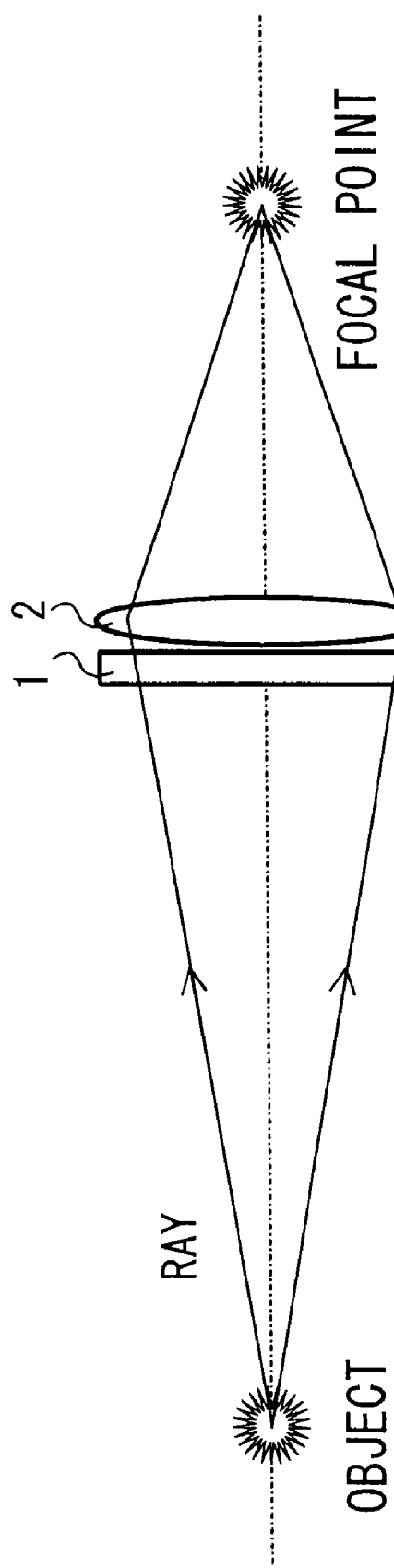
FIG. 1 is a schematic diagram of an imaging system that applies the optical plate for an imaging camera of the present invention.

In the following, details of embodiments of this invention will be described with reference to the drawings. As shown in FIG. 1, an optical plate 1 for an imaging camera is used as an imaging system in combination with an imaging lens 2 such as a convex lens or the like. It can be used in combination with an eyeball lens instead of the imaging lens 2.

Figure 2B:
FIG. 2 is an explanatory diagram relating to the wavefront shape that is an aim of the present invention, showing the wavefront of the image-forming light projected from the imaging lens, (a) being in the case of the imaging lens only, and (b) being in the case of an imaging lens with an attached optical plate for an imaging camera.
Figure 2A:

As described below, the surface of the optical plate for an imaging camera of the present invention is given a shape that has not been used previously, but first the wavefront shape that is an aim of the present invention will be described. (1) In FIG. 2 (a) in the case of a conventional imaging lens only, the wavefront 3 of light that has passed through an ideal imaging lens is spherical, condensing the light at the focal point. (2) On the other hand, FIG. 2 (b) shows a wavefront 4 produced by an imaging lens, obtained using the surface shape in the case of the present invention. When the optical plate for an imaging camera of the present invention is attached, the wavefront becomes a distorted spherical wavefront in which the phase is increasing delayed going from the center to the periphery.

Figure 3A:
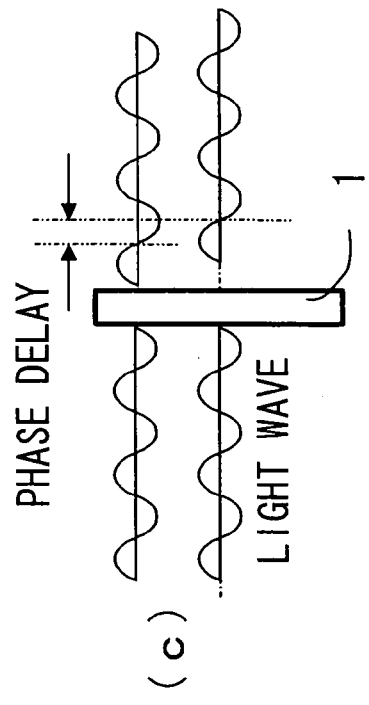
FIG. 3 is a schematic diagram illustrating the deepening of the focal depth by extending the focal point in the direction of the optical axis, which is the effect of the invention.
Figure 3C:
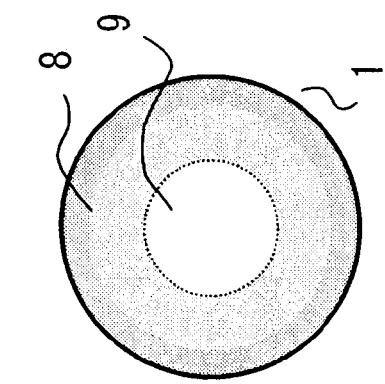
Figure 3B:
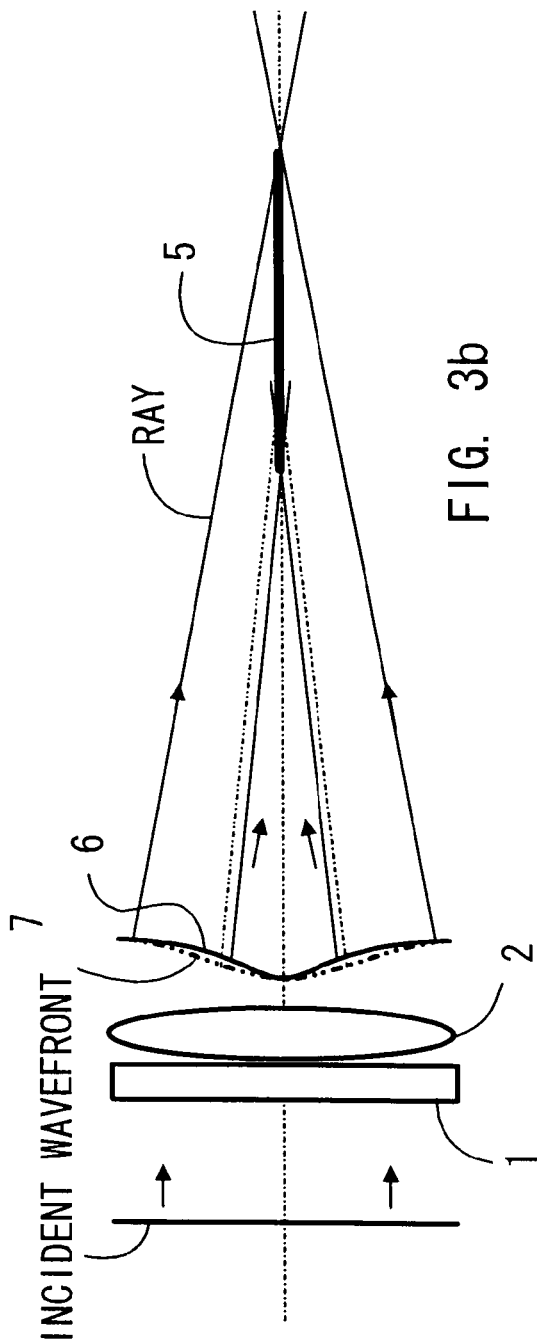

As shown in FIG. 3 (c), by means of this distorted wavefront, focal point 5 is extended in the direction of the optical axis, deepening the focal depth. Unlike in the case of an ordinary imaging lens whereby light beams emerging from everywhere are condensed at the focal point due to the spherical wavefront, in the case of the present invention in which the optical plate for an imaging camera of the present invention is attached, the wavefront becomes a distorted spherical wavefront, as shown by the solid line 6 in FIG. 3 (c), so that a ray that emerges from close to the optical axis is condensed a near region along the optical axis, and a ray that emerges from more towards the periphery is condensed further away. This extends the focal point, deepening the focal depth. Generally, the focal depth of the image space and the depth of field of the object space are equivalent, so that the depth of field deepens when the focal depth deepens. Also, the wavefront shown by broken line 7 shown in FIG. 3 (c) is the wavefront in the case of Patent Reference 2.

The optical plate 1 for an imaging camera hypothesized by FIG. 3 (b) is shown in FIG. 3 (a). This corresponds to the first optical plate for an imaging camera described below. In the configuration shown as an example in this case, the first region 8 is set on the outside and the second region 9 on the inside. Thus, as shown in FIG. 3 (c), when the respective phases of light transmitted by the second region 9 at the center region of this optical plate for an imaging camera and light transmitted by the peripheral region are compared, the phase of light transmitted by the peripheral region is relatively delayed.

The phase of light transmitted by the optical plate can be increasingly delayed going from the center to the periphery by making the optical path length through the optical plate longer going towards the periphery. As a simple method of changing the optical path length, there is the method whereby the thickness of the optical plate is made thicker going from the center to the periphery. That is, the phase can be increasing delayed going from the center to the periphery by changing the thickness of the optical plate.

The optical system aperture does not have to be round (it may, for example, be elliptical), but here, for simple handling, first, the optical plate is made axially symmetrical, and with a as the effective radius and r as the unit radius of the length, and ρ as a radial variable defined as 0~1. Then, ρ is expressed by the following equation.

$$\rho = \frac{r}{a} \qquad \text{[Mathematical equation 1]}$$

Next, the surface shape of the optical plate is considered, taking w(ρ) as the thickness increment at radius ρ compared to the thickness at the center of the optical plate. For example, for simplicity, taking one side of the optical plate to be a plane surface, the thickness can be changed by changing the shape of the other side, but in that case, if the center surface of the optical plate is the reference surface, then w(ρ) will be a height relative to the reference surface at radius ρ. At a portion where w(ρ) is constant, the optical path length does not change, so the phase is not changed.

Below is described a case in which, when the incidence plane and exit plane of the optical plate are surfaces having a curvature, the shape of one side is changed to a plane surface without changing the thickness, and only the other side, for example the exit plane, has a curvature.

Next, specific optical plate shapes are discussed. The optical plate is attached in front of an imaging lens, so the effective aperture diameter of the optical plate is made equal to the effective aperture diameter of the lens. The above first optical plate for an imaging camera and second optical plate for an imaging camera are each described in the following.

Example Embodiment 1

A first optical plate for an imaging camera is characterized in that, of the effective apertures thereof, a phase of light transmitted by an inside region having a surface ratio of 50 percent or more relative to the effective aperture is increasingly delayed going from the center to the periphery, and the phase of light transmitted by the remaining outside region (an outside annular strip in the case of a circular aperture) remains fixed and unchanging.

Figures 12A, 12B, 12C:
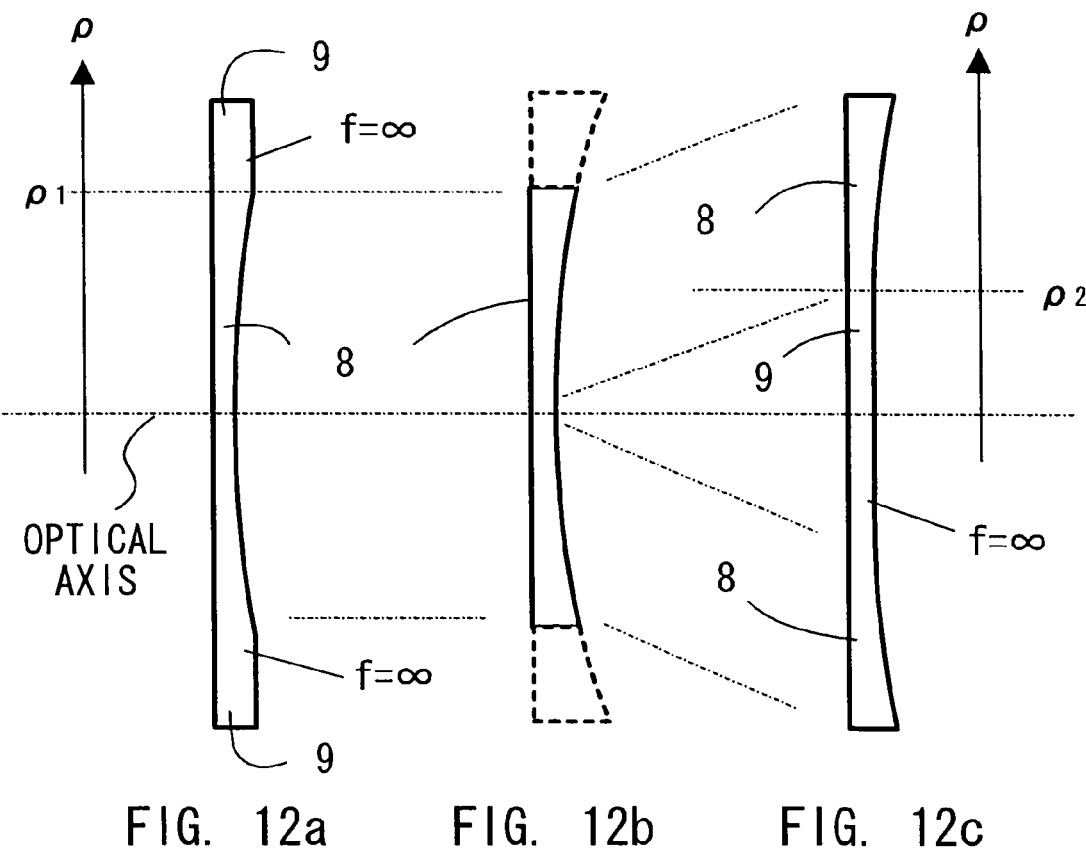
FIG. 12 is a schematic diagram showing the cross-section of first optical plates for an imaging camera, in which first region 8 and second region 9 are shown with (a) the first region in the center portion and (c) the first region in the outside portion, and (b) in the case of a conventional correcting plate.

A schematic diagram showing the cross-section of a optical plate for an imaging camera in such a case is shown in FIG. 12. To just increasingly delay the phase going from the inside to the periphery, as shown in FIG. 12 (b), the optical plate thickness need only to be made increasingly thicker going from the optical axis to the periphery, and, further, to keep the phase at the perimeter fixed and unchanging, as indicated by the symbol 9 portion in FIG. 3 (a), the thickness in FIG. 12 (a) need only to be made constant.

Also, as shown in FIG. 12 (c), a phase of light transmitted by an outside region having a surface ratio of 50 percent or more relative to the effective aperture can be increasingly delayed going to the periphery (an outside annular strip in the case of a circular aperture), and the phase of light transmitted by the remaining inside region can be made fixed and unchanging.

Thinking of the state of the phase of transmitted light being increasing delayed going from the center to the periphery at the wavefront, the wavefront curvature becomes increasingly negative going to the periphery (a backwardly curved wavefront in which the curvature is greater towards the periphery).

The first characteristic of the first optical plate for an imaging camera is that in the case of a circular aperture, the phase of light transmitted by the remaining portion is increasing delayed going from the center to the periphery with the phase of light transmitted within a peripheral strip or within the central circle fixed and unchanging. To realize an optical plate having such a function, there is for example the above-described simple method wherein one of the two sides of the optical plate is a plane surface and the shape of only the other side is changed, giving the inside of the other side the above shape and leaving the plane surface on the outside unchanged. The shape of one side of an optical plate having the function whereby curvature of the wavefront of transmitted light is increasing delayed going from the center to the periphery is expressed by variable $f(\rho)$. That is provided, however, that $f(\rho)$ is normalized to be 1 at the aperture open end ($\rho=1$).

Expressing such a special surface shape of a first optical plate for an imaging camera as a mathematical equation using change in thickness $w(\rho)$, taking the bottom surface as the point of reference at the center, the following numerical formula is produced using plane geometry $f(\rho)$ in the case of the first method in which the phase is fixed and unchanging at the outside annular strip.

$$w(\rho) = Af(\rho) \quad (0 \le \rho \le \rho_1) \quad \text{[Mathematical equation 2]}$$
$$= Af(\rho_1) \quad (\rho_1 \le \rho \le 1)$$

Here, A is $w(\rho)$ value $w(1)$ at aperture open end ($\rho=1$), when calculated using $f(\rho)$. $w(1)$ is amount of increase in aperture open end thickness relative to the thickness at the center; since in a case in which with one side being a plane surface the thickness of only one side is changed, A corresponds to the height of the aperture open end from the bottom of the concave surface. That is provided, however, that $\rho_1$ is a constant that is the value of the radial variable $\rho$ of the boundary of the fixed phase portion and the changing phase portion, that is to say, it is an inside radial value of the annular strip.

$0 \le \rho \le \rho_1$ is the region that changes the phase, and the remaining $\rho_1 \le \rho \le 1$ is the region where the phase is fixed.

Figure 4:
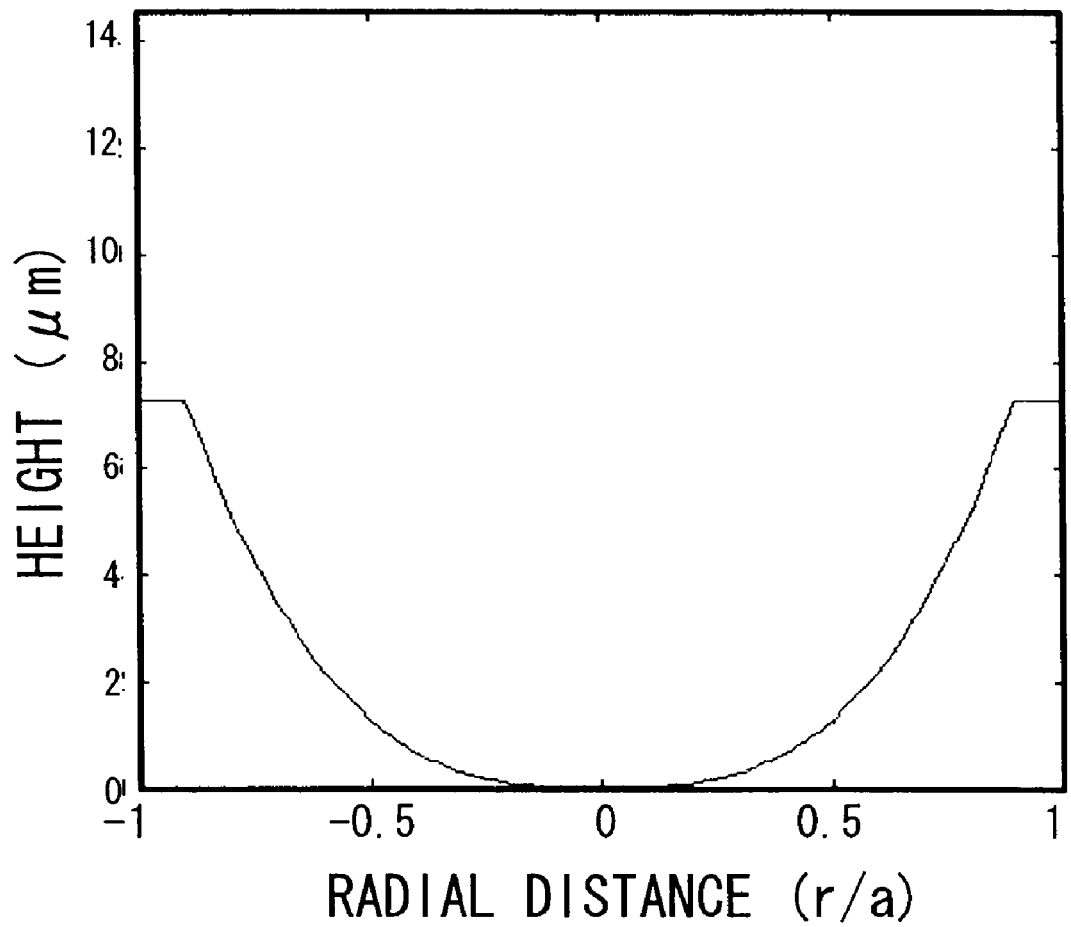
FIG. 4 is a diagram showing an example of the cross-sectional shape of a first optical plate for an imaging camera according to a first method.

FIG. 4 shows an example of the cross-sectional shape of a first optical plate for an imaging camera according to the first method. FIG. 4 shows height (that is, thickness) versus radial distance. As an example, in mathematical equation 2, it is assumed that A=10 μm, $\rho_1$=0.9. In this example, one side of the optical plate for an imaging camera is a plain surface and the shape of the other side is changed. FIG. 4 shows this surface with a double structure, having a special shape.

Next, a case of the second method in which the phase within the center circle of the first optical plate for an imaging camera is fixed and unchanging, as a mathematical equation, is expressed by the following mathematical equation, in which $w(\rho)$ is substituted in mathematical equation 2.

$$w(\rho) = 0 \quad (0 \le \rho \le \rho_2) \quad \text{[Mathematical equation 3]}$$
$$= Af(\rho - \rho_2) \quad (\rho_2 \le \rho \le 1)$$

Here, $\rho_2$ is a constant that is the value of the radial variable $\rho$ of the boundary of the changing phase portion with the fixed phase portion, that is to say, it is a radial value of the inside circle, the phase being fixed, and $0 \le \rho \le \rho_2$ is the region that changes the phase. The value $w(1)$ of $w(\rho)$ at the aperture open end ($\rho=1$) is A in a case where the surface shape is given by $Af(\rho)$, but since in mathematical equation 3, it is $Af(1-\rho_2)$, it becomes to be smaller than A. That is because if a new variable $\rho'$ is considered and defining $\rho'$ as $\rho'=\rho-\rho_2$, the aperture open end viewed at variable $\rho'$ will be $1-\rho_2$. Therefore in order to make the value at the aperture open end in the same order in the second method as in the case of the first method and obtain an effect of the same order, the value of A in mathematical equation 3 has to be made sufficiently larger than the value in mathematical equation 2.

With the shape of mathematical equation 3, the origin of the surface shape variable $f(\rho)$ is shifted radially from the center by $\rho_2$. As another means of making the phase at the center portion fixed, a possible method is to use a shape that is a continuous variable from the center to the aperture open end as a base for making just the center portion a plane surface. In that case, however, there would be almost no effect, making it unusable for the desired object of deepening the focal depth. This is revealed by the computer simulations and the like although will not be described here.

Figure 5:
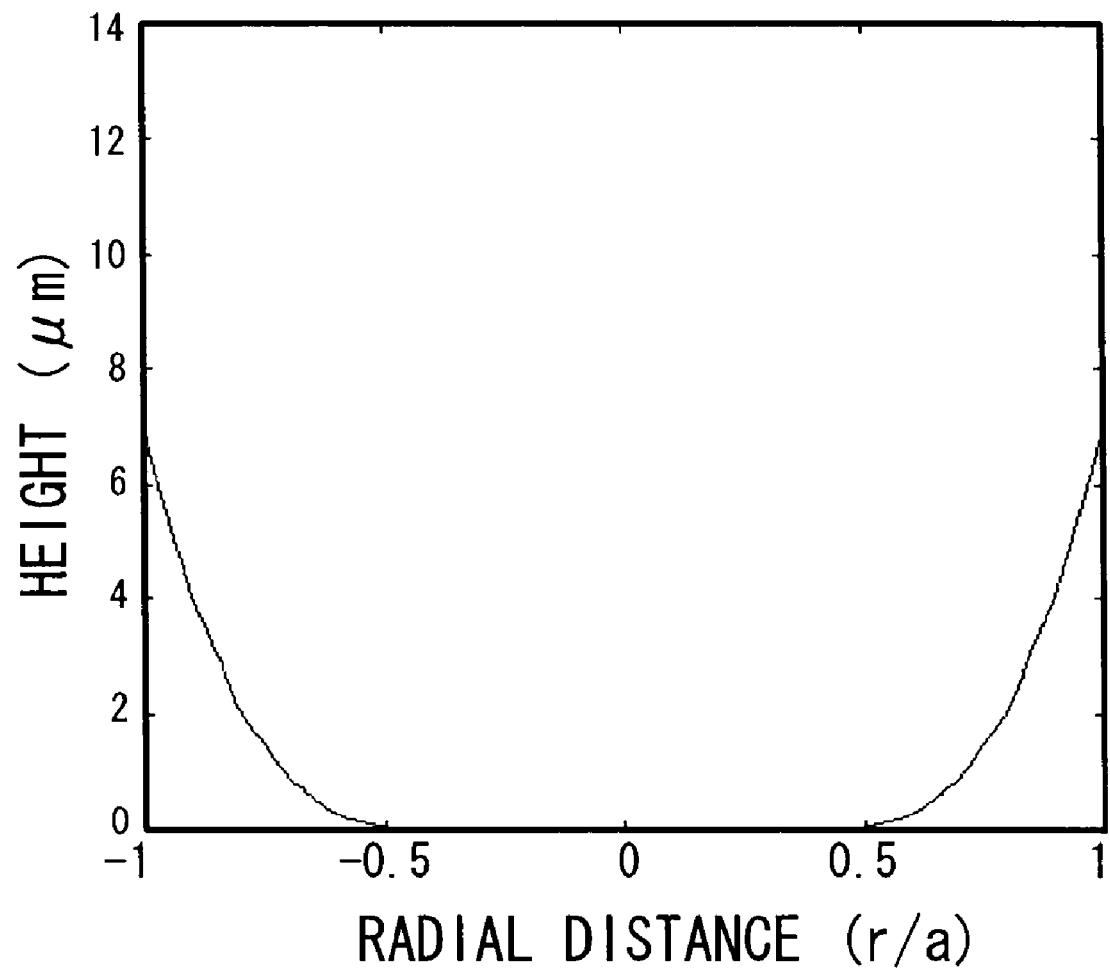
FIG. 5 is a diagram showing an example of the cross-sectional shape of a first optical plate for an imaging camera according to a second method.

FIG. 5 shows an example of the cross-sectional shape of a first optical plate for an imaging camera according to the second method. To make the height of the surface at the aperture open end in FIG. 5, a height of the same order as in the case of FIG. 4 (approximately 7 μm), in mathematical equation 3, A=30 μm is used and $\rho_2$=0.4 is used as the radial value of the boundary to make phase fixed. In this example, in the same way as in the case of the first method introduced previously, one side of the optical plate for an imaging camera is made a plane surface, and the shape of the other side is changed. FIG. 5 shows the surface of the optical plate with a double structure, having a special shape.

Example Embodiment 2

A second optical plate for an imaging camera is characterized in that it is equipped with both a function that shifts the focal point position from long distance to short range, and a function that increasingly delays the phase of transmitted light, going from the center to the periphery, deepening the close range depth of field, making it possible to see a wide range of close-distance at one focal point position. Taking for example an ordinary camera in a state in which it is focused to infinity as a standard state of camera use, in the standard state, images at a short distance and especially at a close distance are blurred. To view a close distance, the focal point position has to be moved to focus to the close distance, but even when it is focused, the depth of field at close distances is very small, making it impossible to view a wide range of distance. On the contrary, attaching the second optical plate for an imaging camera instantly enables close distances to be viewed over a wide range.

Figure 13A:
FIG. 13 is a schematic diagram showing cross-sections of a second optical plate for an imaging camera, with (a) showing a synthesized shape, (b) a first shape, and (c) a second shape.
Figure 13B:
Figure 13C:

A schematic diagram of the cross-section of optical plates for an imaging camera in this case is shown in FIG. 13. FIG. 13 (*a*) corresponds to the second optical plate of the present invention. This shape is a synthesis of the first shape shown in FIG. 13 (*b*), that is, a concave surface shape in which the curvature of the surface shape increases going from the optical axis to the periphery, a thickness thereof becoming thicker going from the center to the periphery, so that the phase of transmitted light is increasingly delayed going from the center to the periphery, and the second shape shown in FIG. 13 (*c*), that is, a convex surface shape in which the curvature of the surface shape is fixed, having the function of shifting the focal point position from long distance to short distance.

The function and method of increasingly delaying the phase of transmitted light going from the center to the periphery are the same as in the above-described first optical plate for an imaging camera. That is, by means of the shape of the above variable $f(\rho)$, the thickness of the optical plate for an imaging camera changes to be thicker going towards the periphery. On the other hand, if the state in which the focal point position is shifted from long distance to close distance is considered in terms of wavefront, the optical plate for an imaging camera only needs to function to further increase the curvature of the wavefront of the original light condensed by the imaging (image formation) lens. If concave and convex surface shapes are each defined by axially symmetrical positive and negative variables, an easy method of imparting the function of increasing the curvature of transmitted light to the optical plate for an imaging camera is to just make the surface shape of the optical plate for an imaging camera a negative two-dimensional variable. A surface shape that is a negative variable is a convex surface shape, and in a case in which the phase of transmitted light is increasingly delayed going from the center to the periphery, it is necessary to take care to make the shape the inverse of when the shape is made concave.

Therefore, as a mathematical equation, a shape for imparting these two functions to an optical plate for an imaging camera can be expressed as the sum of two variables having different signs, as in the following equation.

$$w(\rho)=A_1 f(\rho)-A_2 \rho^2 \quad \text{[Mathematical equation 4]}$$

Here, $A_1$, $A_2$ are each a $w(\rho)$ value $w(1)$ at an aperture open end ($\rho=1$) when the first and second terms of mathematical equation 4 are thought of as each being an independent variable. The first term on the right side of the above mathematical equation 4 is a first shape of a concave surface in which the thickness thereof becomes thicker going from the center to the periphery, so as to increasingly delay the phase of transmitted light, going from the center to the periphery, and the second term is a second shape of a convex surface that has the function of shifting the focal point position from long distance to short distance. A second optical plate for an imaging camera can be formed by synthesizing these. In mathematical equation 4, the second shape is a paraboloid, but it does not have to be limited thereto and may be spherical. In this connection, with the second optical plate the convex surface is handling an extremely loose shape, so at a sufficiently high precision the two-dimensional variable can be viewed as a surface having a fixed curvature.

Figure 6:
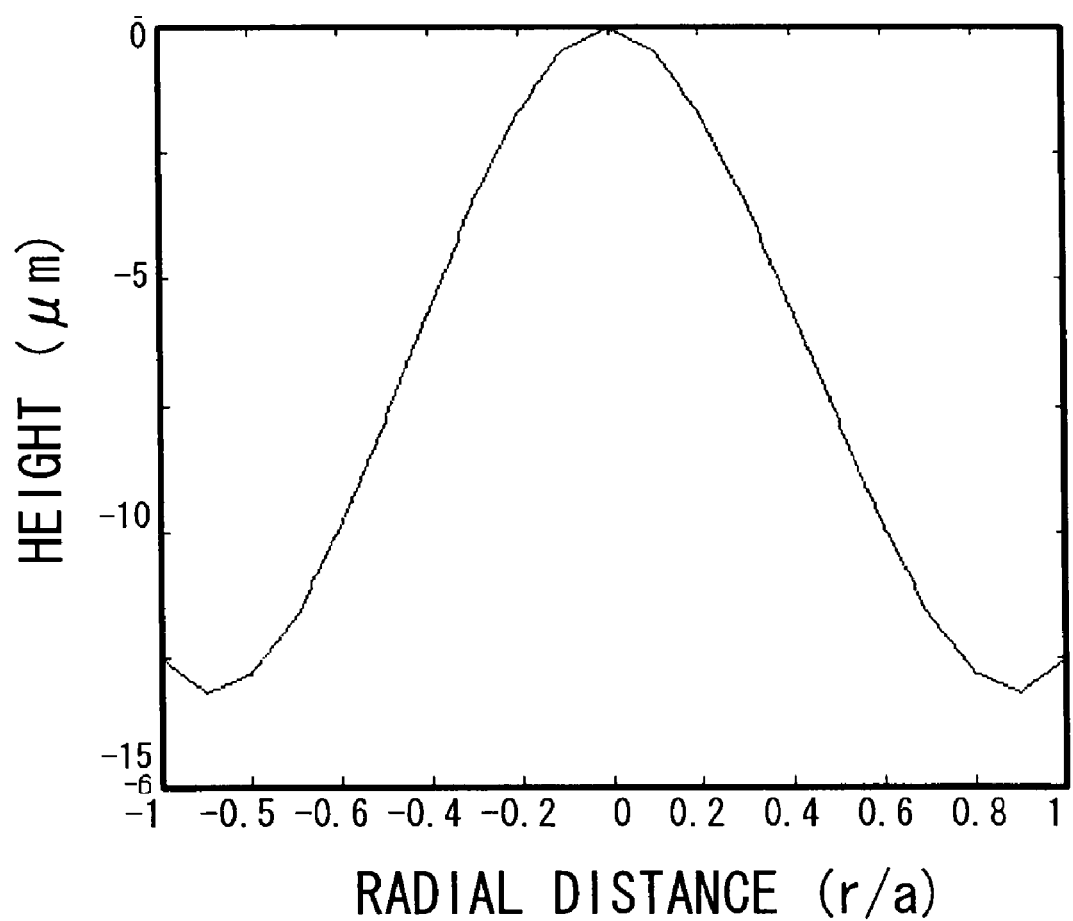
FIG. 6 is a diagram showing an example of the cross-sectional shape of a second optical plate for an imaging camera.

FIG. 6 shows an example of the cross-sectional shape of a second optical plate for an imaging camera. FIG. 6 shows a case in which, in mathematical equation 4, $A_1=15$ µm, $A_2=20$ µm. In this example, as in the case of FIG. 4, one side of the optical plate for an imaging camera is a plane surface and the shape of the other side is changed. The surface shape is convex in the center portion (relative to the concave shape of the first optical plate for an imaging camera), and the peripheral portion is concave. The reason that a synthesis forms a convex surface at the center portion is because a shape is given whereby in mathematical equation 4, $A_2$ is larger than $A_1$.

Next, examples of specific computer simulations are introduced with respect to the effect in the case of an imaging system that combines the first optical plate for an imaging camera, the second optical plate for an imaging camera, with an imaging lens. The computer simulations assume the standard values for an imaging camera of a lens effective aperture diameter: 2.5 cm, focal distance: 7.5 cm (therefore F3), and a center of received light wavelength of 0.6 µm.

Figure 7:
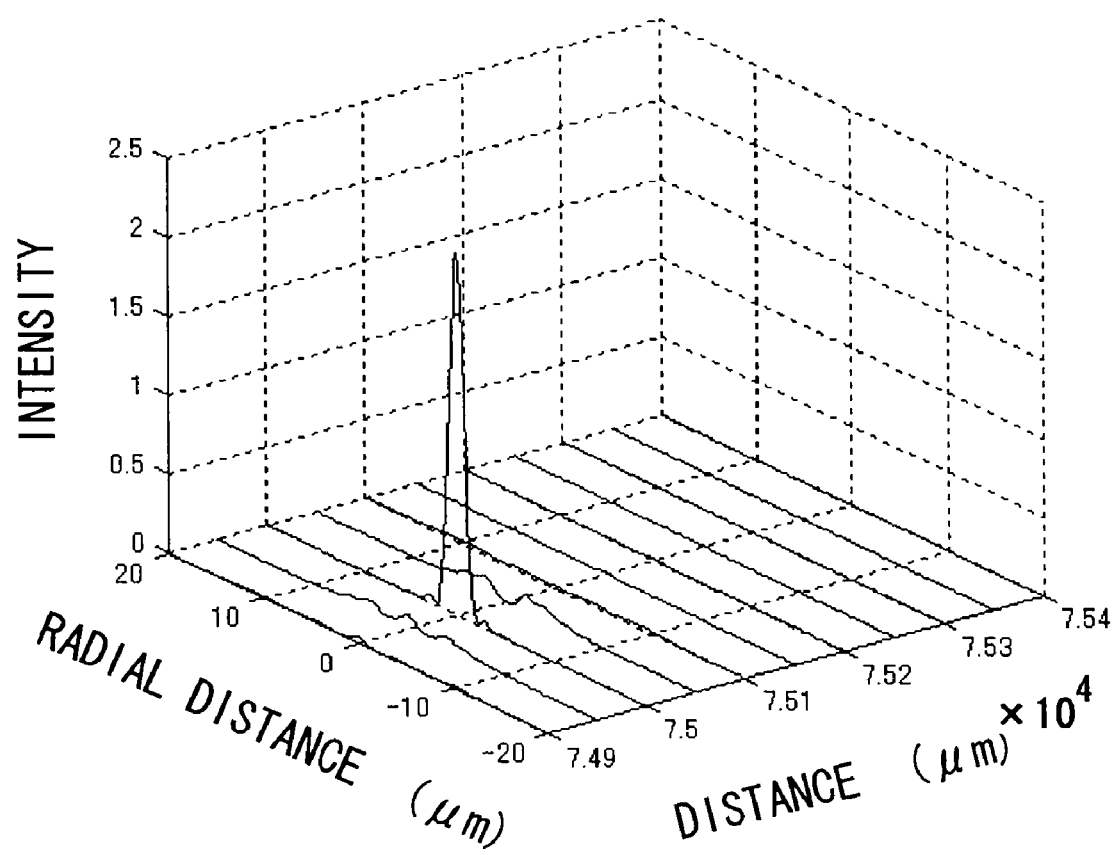
FIG. 7 is a diagram showing the condensed light beam pattern of a focal point region based on an ordinary imaging lens.

FIG. 7 shows the condensed light beam pattern of a focal point region based on an ordinary imaging lens with these specifications. The indicating range is a radius of 20 µm (diameter of 40 µm) and 500 µm in the direction of the optical axis (0.5 mm). Object distance is infinity, so that the light is condensed at the 7.5 cm focal length position of the imaging lens.

Generally, even when the distance of the object changes, there will be hardly any change in the condensed light beam pattern if the condensed light focal point position is shifted. Accordingly, the object distance is assumed to be the reference infinity. In all cases below, the object distance is assumed to be the reference infinity.

Figure 8:
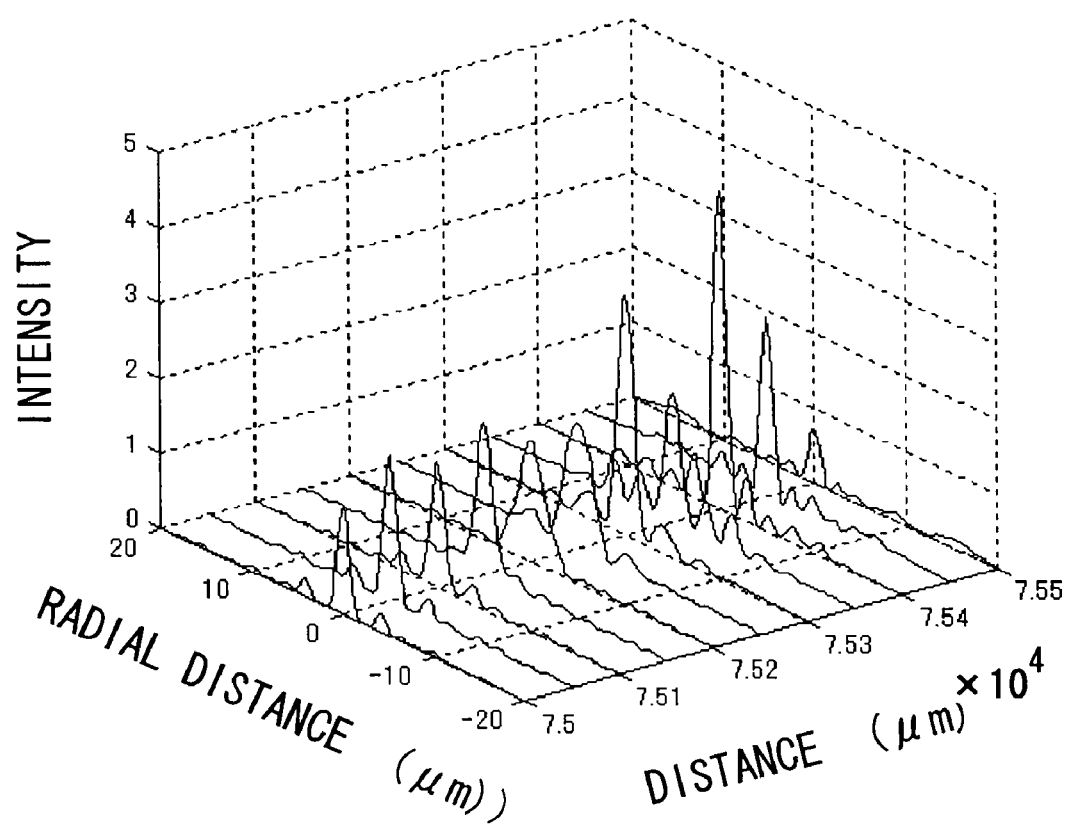
FIG. 8 is a diagram showing the condensed light beam pattern at the focal point region in a case in which the first optical plate for an imaging camera that is attached in front of the imaging lens is an optical plate having a shape according to a first method (a method in which at the outside portion the phase is fixed and unchanging).

FIG. 8 shows the condensed light beam pattern at the focal point region in a case in which the first optical plate for an imaging camera that is attached in front of the imaging lens is an optical plate having a shape according to a first method (a method in which at the outside portion the phase is fixed and unchanging). At a depth of 500 µm the indicating range is the same as when only the imaging lens of FIG. 7 is used, but when the first optical plate is attached the focal depth is extended and at the same time, there is a secondary effect that the focal point region is shifted slightly forwards, so the indicating region of FIG. 8 is slightly shifted from that of FIG. 7, so the front state can be seen. Compared to the case in FIG. 7 in which only the imaging lens is used, it can be understood that the focal depth is extended considerably forwards (focal depth is deepened).

In this way, a characteristic is that while the focal depth is deepened by attaching the optical plate for an imaging camera of the present invention, the width of the main lobe of the beam cross-sectional profile that determines the resolution of the optical system is almost unchanged from the above case of the imaging lens alone, forming a non-diffractive beam; it can be seen that the effect of this is that the focal depth is deepened and almost the same resolution is obtained.

Figure 9:
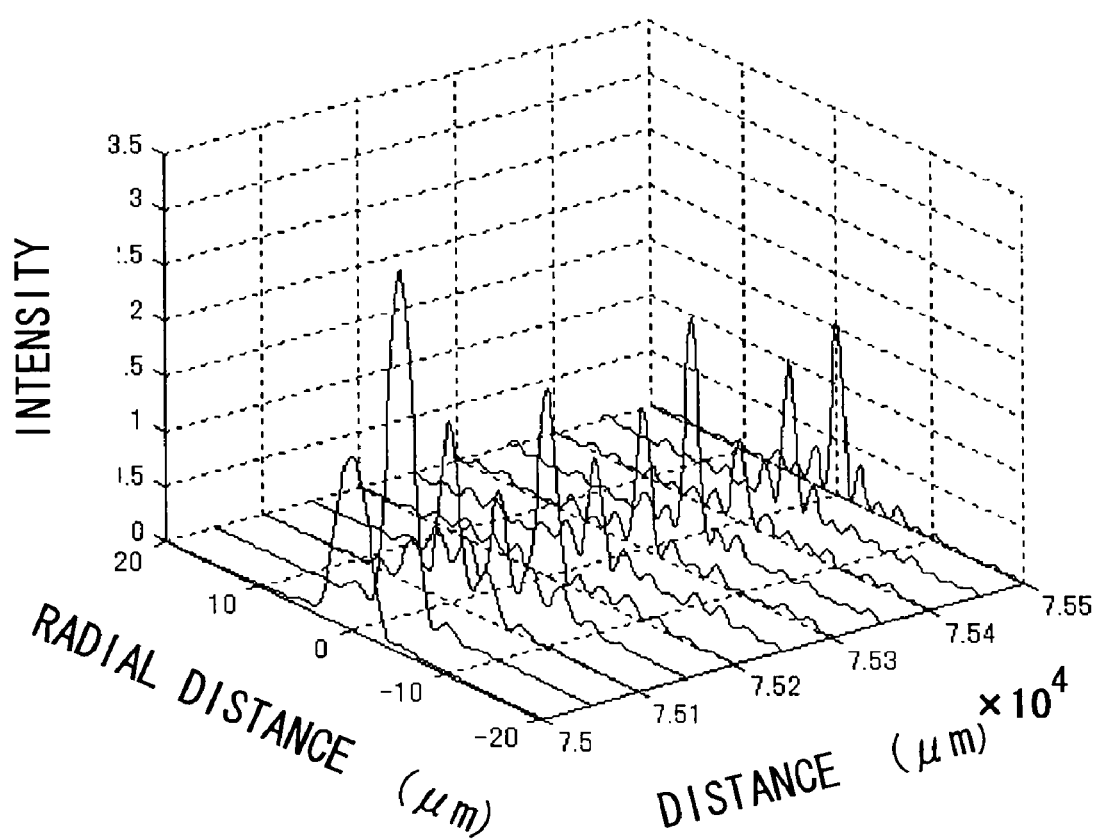
FIG. 9 is a diagram showing the condensed light beam pattern at the focal point region in a case in which the first optical plate for an imaging camera that is attached in front of the imaging lens is an optical plate having a shape according to a second method (a method in which at the center portion the phase is fixed and unchanging).

FIG. 9 shows the condensed light beam pattern at the focal point region in a case in which the first optical plate for an imaging camera that is attached in front of the imaging lens is an optical plate having a shape according to a second method (a method in which at the center portion the phase is fixed and unchanging). The indicating range is the same as in the case of FIG. 8. As in the case of the first method of FIG. 8, compared to the case of FIG. 7 in which only an imaging lens is used, it can be seen that the focal point is extended considerably forwards (focal depth is deepened). However, at the mid-part of the focal point region the side lobe is somewhat larger, showing that the light condensing state is somewhat degraded compared to the case of the first method.

Figure 10:
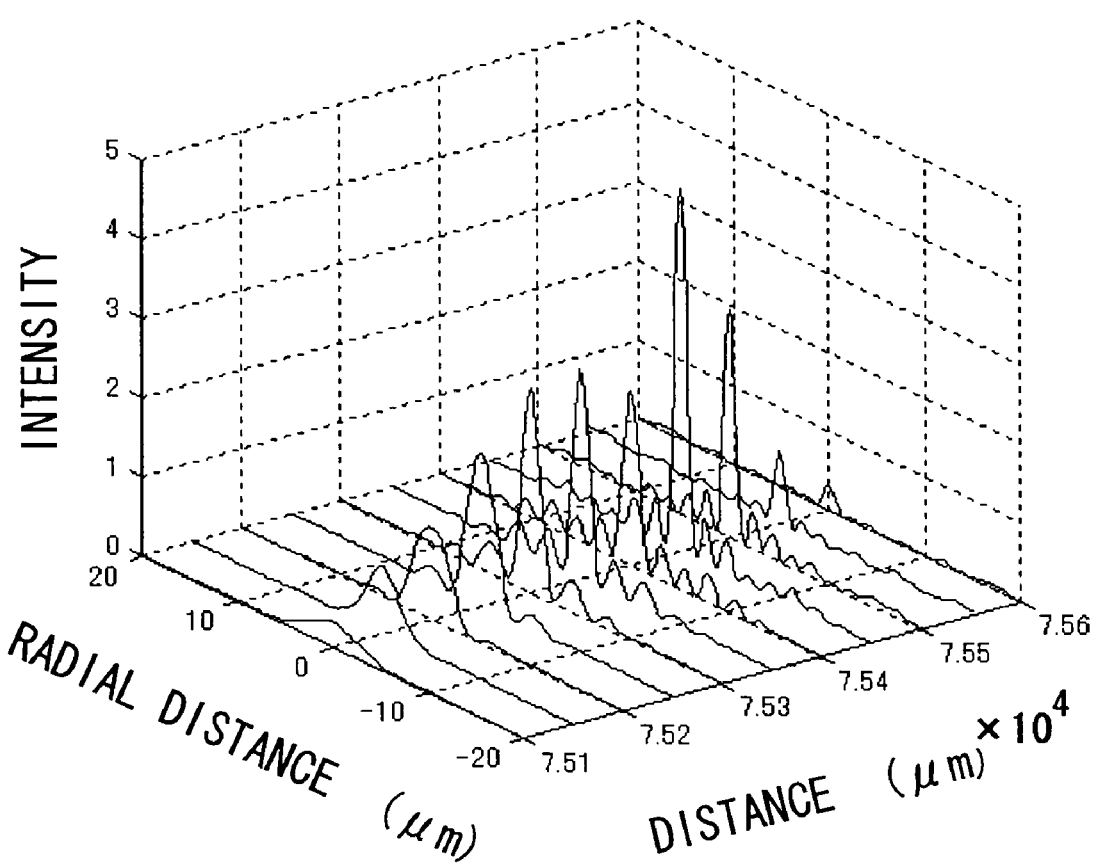
FIG. 10 is a diagram that for comparison shows the condensed light beam pattern in a case in which the focal point is formed by conventional technology, that is, in a case in which the shape has a simple structure in which the phase is delayed more towards the periphery.

FIG. 10 is a diagram that for comparison shows the condensed light beam pattern in a case in which the focal point is formed by conventional technology in which the shape has a simple structure in which the phase is delayed more towards the periphery, that is, not a special double-structure shape that flattens part of the region in the aperture, as in the first optical plate for an imaging camera. The indicating range depth of 500 µm is the same as in FIG. 8, but the indicating region has been moved back 100 µm to also show the depth state. If this is compared to FIG. 8, in contrast to the case of the first optical plate in FIG. 8 in which the focal point region is continuously extended forwards from the 75 mm focal point position without an optical plate, at the front in FIG. 10, there is an empty space portion close to the original focal point position (no focal point region that overlaps the original focal point region), and the overall focal depth is shallower. That is, it can be seen that a merit of the special optical surface shape such as that of the first optical plate for an imaging camera, is that it creates a focal point region that continues from the original focal point position, and deepens the focal depth.

Preferably, when the aperture region of the first optical plate for an imaging camera of the present invention whereby the phase is fixed and unchanging is provided at the perimeter portion, that region is an outside annular strip having an inside diameter ratio that is approximately 70 percent or more than the effective aperture diameter, and when it is provided at the center portion, is a circle having a diameter ratio that is approximately 70 percent or less than the effective aperture diameter of that region. If the inside diameter of the outside annular strip that is the fixed-phase region is more than approximately 70 percent (approximately 50 percent in terms of surface ratio) of the effective aperture diameter of the optical plate, the effect of deepening the focal depth is reduced, while conversely, if the fixed-phase outside annular strip region is made too small, it will come close to a case in which the phase is changed at the wide-open aperture, so that although the focal depth is deepened, as described above, the focal point region shifts forwards, producing an empty space portion. The effect with respect to the increasing or decreasing of the fixed-phase region in a case in which the diameter of the fixed-phase region at the center portion is made larger or smaller than approximately 70 percent (approximately 50 percent in terms of surface ratio) of the effective aperture diameter inside the circle, will be the same as the effect of increasing or decreasing the fixed-phase region of the peripheral portion. Therefore, it is preferable for the user to set the fixed-phase region to obtain the optimal state for the purpose.

Figure 11:
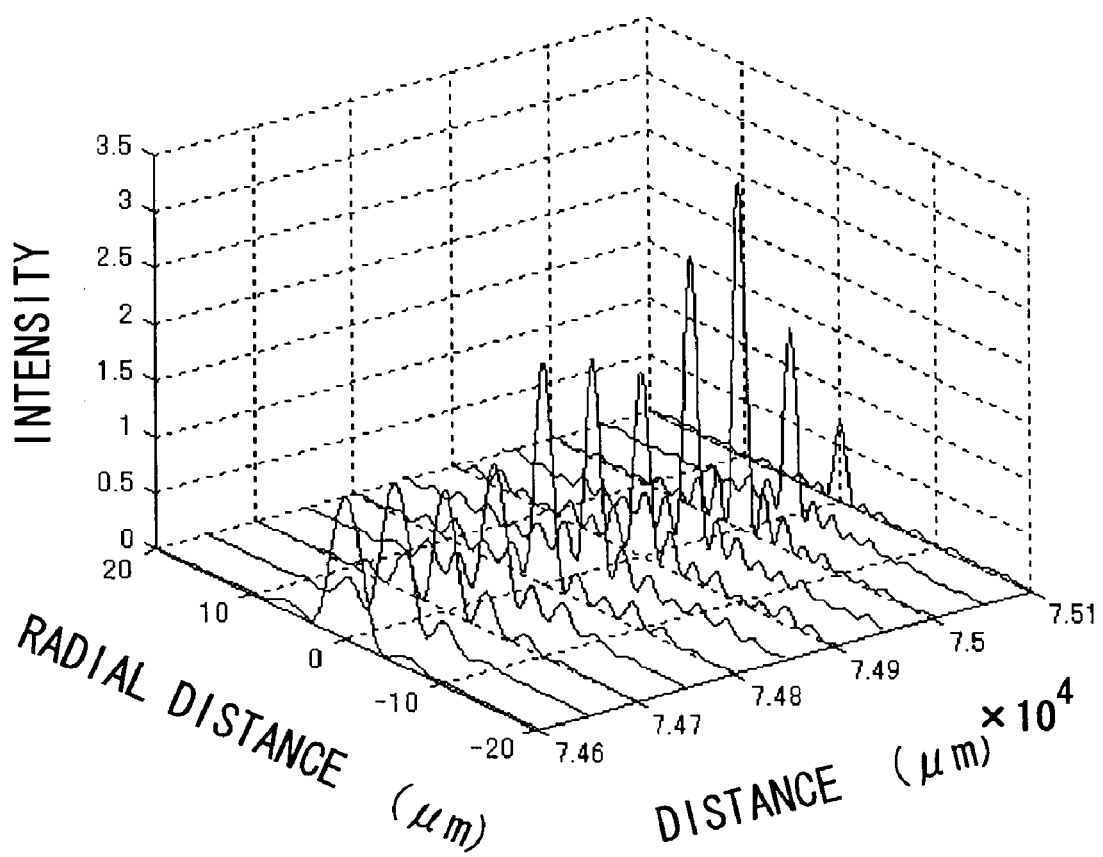
FIG. 11 is a diagram showing the condensed light beam pattern at the focal point region in the case of an imaging system in which the second optical plate for an imaging camera is attached in front of the imaging lens.

FIG. 11 shows the condensed light beam pattern at the focal point region in the case of an imaging system in which the second optical plate for an imaging camera is attached in front of the imaging lens. The indicating region is 500 µm, the same as in the case of FIG. 6 to FIG. 11. The focal depth is deepened, and at the same time the focal point region (including the original focal point position of the imaging lens) is shifted considerably backwards (closer to the lens). FIG. 11 is the condensed light beam pattern of a light beam from infinity, but a light beam from close distance will maintain this focal depth and condense the light forward. By means of these effects, a close-distance object can be viewed at a wide distance region by simply attaching the optical plate for an imaging camera of the present invention (with the focal point position of the camera kept fixed at infinity).

In accordance with another computer simulation, obtaining an accurate distribution of the optical axial center intensity of a condensed light beam with the same parameters and calculating the focal depth with the full width half maximum (FWHM) of the optical axial distribution as the focal depth gives (1) Only imaging lens: 120 µm
(2) With the first optical plate for an imaging camera attached: 550 µm (employing the first method as an example)
(3) With the second optical plate for an imaging camera attached: 550 µm (focal point shift: approximately 0.5 mm).

Here, however, in obtaining the focal depth from the optical axial distribution of the center intensity of the condensed beam, the depth width level in a case of only the imaging lens was set to be equal to the FWHM in a case in which an optical plate for an imaging camera was attached, and the focal depth was obtained empirically.

In the above way, in a case of a shape that is not made the double-structure surface shape of the first optical plate for an imaging camera but whereby the phase simply becomes increasingly delayed going towards the periphery (that is, the shape of a conventional optical plate), the focal depth was approximately 400 µm, so the value of 550 µm of the first optical plate shows that the special double-structure within the aperture has the effect of multiplying the focal depth by approximately 1.35 times.

Calculating the depth of field from these focal depths, using a 75 mm focal distance imaging lens, gives (4) Only imaging lens: 45 m~∞,
(5) With the first optical plate for an imaging camera attached: 10 m~∞, so it can be quantitatively understood that attaching an optical plate deepens the depth of field. However, with the first optical plate for an imaging camera, the field shifts towards the long distance side, so that, for example, to set the distance in front of the object to 10 m, the optical plate has to be attached with the camera focused sufficiently more than 10 m to the front. If the diopter A (defined by the coefficient A of function f(ρ) given by mathematical equations 2, 3) is increased, the depth of field can be made deeper compared to the case of the above example.

Computing the depth of field of the second optical plate for an imaging camera from the focal depth and focal point shift gives (6) With the second optical plate for an imaging camera attached: 10 m~∞ (camera focal point position is ∞).

The field with just the imaging lens is 45 m~∞, but it can be quantitatively understood that with an optical plate attached, even with the camera focus fixed at ∞, the field becomes 10 m~∞, and short distances can be seen over a wide range without changing the focus. In this connection, in the case of just an imaging lens, with a focusing distance of 10 m, the field is very small as 10 m~13 m, so that even if the focus is adjusted, a wide range cannot be seen. With the second optical plate for an imaging camera, unlike with the first optical plate for an imaging camera, the amount of focal point shift can be freely adjusted by adjusting the diopter of the synthesized convex shape, making it possible to obtain a deep field at close range (for example, 5 m~16 m).

Moreover, the distance that is applied can be changed by adjusting the diopter A of the optical plate. For example, shorter distances can be seen over a wide range by increasing the focal point shift amount or increasing the diopter A of the optical plate, so the design can be made according to the purpose.

INDUSTRIAL APPLICABILITY

The above description shows the case of an application to an imaging lens, and here the imaging lens may be an eyeball lens. In this case, the present invention would be applied to eyeglasses or the like, and their use by the operator of a high-speed moving body could reduce the burden that the focal point adjusting function has on the eyeball lenses. Also, for example, it can be a light-condensing lens for condensing the light to a small point used when inputting a light signal to optical fiber, or when detecting reflected light from a high-density memory disk. In this case, the present invention could ease the tolerance of differences in the distances from light source or point of reflection.

Also, the present invention does not have to be limited to an axially symmetrical lens. For example, the above effect can be obtained by applying it to an optical system that uses a cylindrical lens. The present invention can also be applied to an optical system with an elliptical aperture. Furthermore, the same effect can be obtained with a phase control region set as an inside region in the effective aperture, or a plane-surface-shaped region that does not control the phase, the center of which is offset with respect to the center axis.

The invention claimed is:

1. An optical plate for an imaging camera, comprising:
a first region and a second region within an effective aperture on an incidence plane or exit plane of the optical plate,
wherein the optical plate is orthogonal to an optical axis of the imaging camera, has an effective aperture diameter that is the same as an effective aperture diameter of the imaging camera, and is configured to attach in front of the imaging camera to enable depth of field to be deepened,
wherein the first region is an inside region of the optical plate that has a surface ratio that is 50 percent or more of the effective aperture, and has a curvature of a surface shape of the incidence plane or exit plane that increases going from the optical axis to a periphery thereof,
wherein a thickness of the first region increases going from a center to the periphery thereof, such that a phase of transmitted light is increasingly delayed going from the center to the periphery thereof, and
wherein a phase of light transmitted by the second region has no transmission position dependency, the second region being outside of the first region, and having a plane parallel plate shape.

2. An optical plate for an imaging camera, comprising:
a first region and a second region,
wherein the optical plate is orthogonal to an optical axis of the imaging camera, has an effective aperture diameter that is the same as an effective aperture diameter of the imaging camera, and is configured to attach in front of the imaging camera to enable depth of field to be deepened,
wherein the first region of the optical plate is an outside region of the optical plate that has a surface ratio that is 50 percent or more of the effective aperture, and has a curvature of a surface shape of an incidence plane or exit plane of the optical plate that increases going from the optical axis to a periphery thereof,
wherein a thickness of the first region increases going from a center to the periphery thereof, such that a phase of transmitted light is increasingly delayed going from the center to the periphery thereof, and
wherein a phase of light transmitted by the second region has no transmission position dependency, the second region being inside of the first region, and having a plane parallel plate shape.

3. An optical plate for an imaging camera, comprising:
an incidence plane or exit plane shape that is a synthesis shape of a first shape and a second shape,
wherein the optical plate is orthogonal to an optical axis of the imaging camera, has an effective aperture diameter that is the same as an effective aperture diameter of the imaging camera, and is configured to attach in front of the imaging camera to enable depth of field to be deepened,
wherein the first shape of the incidence plane or exit plane shape is a concave surface shape having a curvature that increases going from the optical axis to a periphery thereof,
wherein a thickness of the first shape increases going from a center to the periphery thereof, such that a phase of transmitted light is increasingly delayed going from the center to the periphery thereof,
wherein the second shape is a convex surface shape having a constant curvature that has a function of shifting a focal point position from a long distance to a short distance side, and
wherein the synthesis shape has a curvature of a finite value greater than 0 in a central portion thereof.

* * * * *